United States Patent
Kim et al.

(10) Patent No.: US 12,168,457 B2
(45) Date of Patent: Dec. 17, 2024

(54) AUTONOMOUS DRIVING APPARATUS AND METHOD FOR GENERATING PRECISE MAP

(71) Applicants: Hyundai Motor Company, Seoul (KR); Kia Corporation, Seoul (KR)

(72) Inventors: Jeong Hun Kim, Seoul (KR); Sung Won Yoon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 411 days.

(21) Appl. No.: 17/496,179

(22) Filed: Oct. 7, 2021

(65) Prior Publication Data

US 2022/0105958 A1     Apr. 7, 2022

(30) Foreign Application Priority Data

Oct. 7, 2020  (KR) .................. 10-2020-0129480

(51) Int. Cl.
*B60W 60/00*     (2020.01)
*B60W 50/00*     (2006.01)
(Continued)

(52) U.S. Cl.
CPC .... *B60W 60/0015* (2020.02); *B60W 50/0098* (2013.01); *G01C 21/3461* (2013.01); *G06F 16/285* (2019.01); *G06F 16/29* (2019.01); *G06Q 50/265* (2013.01); *B60W 2050/006* (2013.01); *B60W 2554/402* (2020.02);
(Continued)

(58) Field of Classification Search
CPC ......... B60W 60/0015; B60W 50/0098; B60W 2050/006; B60W 2554/402; B60W 2554/801; B60W 2554/802; B60W 2556/10; B60W 2556/50; B60W 30/08; B60W 40/02; B60W 2050/0002; B60W 2556/40; B60W 2556/45; G01C 21/3461; G01C 21/3822; G01C 21/26; G01C 21/3815; G01C 21/3841; G01C 21/3859; G06F 16/285; G06F 16/29; G06Q 50/265;
(Continued)

(56) References Cited

U.S. PATENT DOCUMENTS 5,541,590 A * 7/1996 Nishio ................ B60R 16/0231
                                                    348/148
6,009,359 A * 12/1999 El-Hakim .............. G01C 11/02
                                                    701/28
(Continued)

*Primary Examiner* — Bhavesh V Amin
(74) *Attorney, Agent, or Firm* — Fox Rothschild LLP

(57) ABSTRACT

An autonomous driving apparatus and a method for generating a precise map using the autonomous driving apparatus are configured to vary an application ratio of interpolation to precise map data to be stored depending on an accident risk on a corresponding road and a distance from a host vehicle during driving so as to optimize the precise map data to be stored. The autonomous driving apparatus includes an accident risk classification unit configured to vary the application ratio of interpolation to data and whether or not to store data acquired by applying interpolation to the data depending on the accident risk on the corresponding road and the distance from the host vehicle during driving, and an autonomous driving controller configured to generate the precise map data depending on the accident risk classification unit.

14 Claims, 3 Drawing Sheets

(51) Int. Cl.
  *G01C 21/34* (2006.01)
  *G06F 16/28* (2019.01)
  *G06F 16/29* (2019.01)
  *G06Q 50/26* (2024.01)

(52) U.S. Cl.
  CPC . *B60W 2554/801* (2020.02); *B60W 2554/802* (2020.02); *B60W 2556/10* (2020.02); *B60W 2556/50* (2020.02)

(58) Field of Classification Search
  CPC .............. G05D 1/0088; G05D 1/0274; G05D 2201/0213
  See application file for complete search history.

(56) References Cited

U.S. PATENT DOCUMENTS

| | | | | |
|---|---|---|---|---|
| 6,084,510 | A * | 7/2000 | Lemelson | G08G 1/164 382/104 |
| 6,161,071 | A * | 12/2000 | Shuman | G07C 5/085 340/901 |
| 6,223,125 | B1 * | 4/2001 | Hall | G08G 1/164 701/117 |
| 6,356,839 | B1 * | 3/2002 | Monde | G08G 1/096872 340/995.23 |
| 6,363,161 | B2 * | 3/2002 | Laumeyer | G06V 20/582 382/104 |
| 6,405,132 | B1 * | 6/2002 | Breed | G01S 19/48 701/45 |
| 6,415,226 | B1 * | 7/2002 | Kozak | G01C 21/3697 701/410 |
| 6,480,783 | B1 * | 11/2002 | Myr | G08G 1/096838 340/990 |
| 6,526,352 | B1 * | 2/2003 | Breed | G01S 19/071 701/470 |
| 6,720,920 | B2 * | 4/2004 | Breed | G01S 13/931 342/357.31 |
| 6,768,944 | B2 * | 7/2004 | Breed | B60W 40/06 213/36 |
| 6,917,893 | B2 * | 7/2005 | Dietsch | G01C 15/002 702/152 |
| 7,069,124 | B1 * | 6/2006 | Whittaker | G05D 1/0274 701/28 |
| 7,085,637 | B2 * | 8/2006 | Breed | B60W 40/06 701/470 |
| 7,194,347 | B2 * | 3/2007 | Harumoto | G08G 1/16 340/436 |
| 7,202,776 | B2 * | 4/2007 | Breed | B60W 30/16 340/557 |
| 7,602,404 | B1 * | 10/2009 | Reinhardt | G01C 11/00 345/629 |
| 7,680,749 | B1 * | 3/2010 | Golding | G01C 21/3484 706/14 |
| 7,698,055 | B2 * | 4/2010 | Horvitz | G08G 1/0104 342/357.31 |
| 7,853,372 | B2 * | 12/2010 | Park | G05D 1/0253 382/103 |
| 7,912,633 | B1 * | 3/2011 | Dietsch | G05D 1/0274 701/450 |
| 8,521,424 | B2 * | 8/2013 | Schunder | G01C 21/26 701/453 |
| 8,527,199 | B1 * | 9/2013 | Burnette | G01C 21/3848 701/425 |
| 9,086,292 | B2 * | 7/2015 | Horvitz | G01C 21/3697 |
| 9,134,133 | B2 * | 9/2015 | Denaro | G06F 16/444 |
| 9,218,003 | B2 * | 12/2015 | Fong | G01C 21/20 |
| 9,286,793 | B2 * | 3/2016 | Pan | G08G 1/0112 |
| 9,367,065 | B2 * | 6/2016 | Dolgov | G05D 1/0248 |
| 9,389,085 | B2 * | 7/2016 | Khorashadi | G09B 29/106 |
| 9,430,944 | B2 * | 8/2016 | Grimm | G08G 1/0129 |
| 9,528,834 | B2 * | 12/2016 | Breed | B60R 21/0132 |
| 9,567,077 | B2 * | 2/2017 | Mullan | G05D 1/0088 |
| 9,919,648 | B1 * | 3/2018 | Pedersen | G08G 1/166 |
| 10,001,380 | B2 * | 6/2018 | Annapureddy | G01S 19/42 |
| 10,024,684 | B2 * | 7/2018 | Wang | G08G 1/012 |
| 10,035,259 | B1 * | 7/2018 | Cheng | B25J 9/0084 |
| 10,311,736 | B2 * | 6/2019 | Kayano | G01C 21/3837 |
| 10,334,412 | B1 * | 6/2019 | Kenane | G06V 20/52 |
| 10,579,070 | B1 * | 3/2020 | Konrardy | G07C 5/0841 |
| 10,788,836 | B2 * | 9/2020 | Ebrahimi Afrouzi | G06V 10/764 |
| 11,100,801 | B2 * | 8/2021 | Pipe | G08G 1/166 |
| 11,199,853 | B1 * | 12/2021 | Afrouzi | B25J 13/006 |
| 11,274,929 | B1 * | 3/2022 | Afrouzi | G06T 7/62 |
| 11,351,999 | B2 * | 6/2022 | Luu | B60W 30/0953 |
| 11,435,746 | B1 * | 9/2022 | Ebrahimi Afrouzi | B25J 9/1676 |
| 11,449,061 | B2 * | 9/2022 | Ebrahimi Afrouzi | A47L 9/28 |
| 11,449,063 | B1 * | 9/2022 | Ebrahimi Afrouzi | G06V 20/64 |
| 11,467,587 | B2 * | 10/2022 | Ebrahimi Afrouzi | G06V 10/141 |
| 11,475,770 | B2 * | 10/2022 | Park | G06N 20/00 |
| 11,899,463 | B1 * | 2/2024 | Ebrahimi Afrouzi | G05D 1/0238 |
| 2001/0001133 | A1 * | 5/2001 | Hotta | G09B 29/106 340/905 |
| 2002/0198632 | A1 * | 12/2002 | Breed | G01S 17/86 701/472 |
| 2003/0016146 | A1 * | 1/2003 | Bates | G08G 1/205 340/471 |
| 2003/0191568 | A1 * | 10/2003 | Breed | B60W 40/06 701/469 |
| 2004/0022416 | A1 * | 2/2004 | Lemelson | G07C 5/0891 382/104 |
| 2004/0107042 | A1 * | 6/2004 | Seick | G08G 1/0104 701/423 |
| 2004/0139049 | A1 * | 7/2004 | Hancock | H04L 61/45 |
| 2004/0267455 | A1 * | 12/2004 | Hatano | G08G 1/0104 702/2 |
| 2005/0060069 | A1 * | 3/2005 | Breed | B60W 40/06 701/408 |
| 2005/0134440 | A1 * | 6/2005 | Breed | G08G 1/161 701/45 |
| 2006/0114123 | A1 * | 6/2006 | Eckstein | G08G 1/161 340/691.3 |
| 2007/0005228 | A1 * | 1/2007 | Sutardja | G08G 1/0104 340/933 |
| 2007/0088490 | A1 * | 4/2007 | Sutardja | G08G 1/01 701/117 |
| 2007/0296574 | A1 * | 12/2007 | Smith | G08G 1/0962 340/539.13 |
| 2008/0243380 | A1 * | 10/2008 | Han | G01C 21/3697 701/431 |
| 2009/0140887 | A1 * | 6/2009 | Breed | G01C 21/1656 701/116 |
| 2009/0289812 | A1 * | 11/2009 | Kim | G08G 1/096758 340/905 |
| 2009/0295598 | A1 * | 12/2009 | Denaro | G01C 21/26 340/905 |
| 2009/0295604 | A1 * | 12/2009 | Denaro | G08G 1/096791 707/999.102 |
| 2009/0299615 | A1 * | 12/2009 | Denaro | G01C 21/3658 707/999.107 |
| 2009/0299616 | A1 * | 12/2009 | Denaro | G01C 21/3844 707/999.107 |
| 2009/0299617 | A1 * | 12/2009 | Denaro | G01C 21/3697 707/999.107 |
| 2009/0299622 | A1 * | 12/2009 | Denaro | G01C 21/3697 701/533 |
| 2009/0299624 | A1 * | 12/2009 | Denaro | G01C 21/3697 707/999.102 |
| 2009/0299625 | A1 * | 12/2009 | Denaro | G09B 29/007 707/999.1 |
| 2009/0299626 | A1 * | 12/2009 | Denaro | B60W 10/04 707/999.102 |
| 2009/0299630 | A1 * | 12/2009 | Denaro | G06F 16/29 707/999.001 |
| 2009/0300035 | A1 * | 12/2009 | Denaro | G01C 21/3856 |

(56) References Cited

U.S. PATENT DOCUMENTS

| | | | | |
|---|---|---|---|---|
| 2009/0300053 | A1* | 12/2009 | Denaro | B60W 10/10 |
| | | | | 707/999.102 |
| 2009/0300067 | A1* | 12/2009 | Denaro | B60W 40/072 |
| 2010/0052944 | A1* | 3/2010 | Luke | B60W 40/04 |
| | | | | 340/902 |
| 2010/0332131 | A1* | 12/2010 | Horvitz | G01C 21/3697 |
| | | | | 701/414 |
| 2010/0332266 | A1* | 12/2010 | Tamir | H01L 23/49838 |
| | | | | 340/901 |
| 2011/0210867 | A1* | 9/2011 | Benedikt | G08G 1/01 |
| | | | | 340/905 |
| 2016/0061625 | A1* | 3/2016 | Wang | G01C 21/3697 |
| | | | | 701/454 |
| 2016/0275801 | A1* | 9/2016 | Kopardekar | G08G 5/0082 |
| 2017/0017734 | A1* | 1/2017 | Groh | G06F 30/20 |
| 2017/0210323 | A1* | 7/2017 | Cordova | G08G 1/0129 |
| 2018/0075747 | A1* | 3/2018 | Pahwa | G08G 1/205 |
| 2018/0218619 | A1* | 8/2018 | Brown | G08G 5/0013 |
| 2018/0322783 | A1* | 11/2018 | Toyoda | G06N 20/00 |
| 2019/0137622 | A1* | 5/2019 | Lopez-Hinojosa | G01S 13/867 |
| 2019/0139403 | A1* | 5/2019 | Alam | G08G 1/0112 |
| 2019/0162549 | A1* | 5/2019 | Fouad | G06N 3/006 |
| 2019/0197330 | A1* | 6/2019 | Mahmoud | G06V 20/597 |
| 2019/0220011 | A1* | 7/2019 | Della Penna | G07C 5/085 |
| 2019/0287394 | A1* | 9/2019 | Aoude | G08G 1/096716 |
| 2019/0303686 | A1* | 10/2019 | Guo | G06V 10/75 |
| 2020/0017049 | A1* | 1/2020 | Kobayashi | B60R 21/0134 |
| 2020/0066158 | A1* | 2/2020 | Park | G06N 3/044 |
| 2020/0225673 | A1* | 7/2020 | Ebrahimi Afrouzi | G06N 5/04 |
| 2020/0226853 | A1* | 7/2020 | Ahmed | H04L 9/0618 |
| 2020/0409376 | A1* | 12/2020 | Ebrahimi Afrouzi | G05D 1/661 |
| 2021/0043096 | A1* | 2/2021 | Brown | G08G 5/0082 |
| 2021/0049908 | A1* | 2/2021 | Pipe | G08G 1/0112 |
| 2021/0089040 | A1* | 3/2021 | Ebrahimi Afrouzi | A47L 9/2873 |
| 2022/0066456 | A1* | 3/2022 | Ebrahimi Afrouzi | G06F 3/04883 |
| 2024/0126265 | A1* | 4/2024 | Ebrahimi Afrouzi | A47L 9/0477 |

* cited by examiner

FIG. 2

| ACCIDENT RISK AT POSITION OF HOST VEHICLE | POSITION OF PRECISE MAP: AROUND HOST VEHICLE | INTERPOLATION RATIO OF GEOMETRIC POINT(%) | WHETHER TO STORE DATA OF LOCALIZATION MODEL |
|---|---|---|---|
| SAFETY | WITHIN 100 METERS | 100 | STORED |
| | WITHIN 300 METERS | 50 | DESTRUCTED |
| | MORE THAN 300 METERS | 0 | DESTRUCTED |
| CAUTION | WITHIN 100 METERS | 100 | STORED |
| | WITHIN 300 METERS | 80 | STORED |
| | MORE THAN 300 METERS | 50 | DESTRUCTED |
| DANGER | WITHIN 100 METERS | 100 | STORED |
| | WITHIN 300 METERS | 100 | STORED |
| | MORE THAN 300 METERS | 100 | STORED |

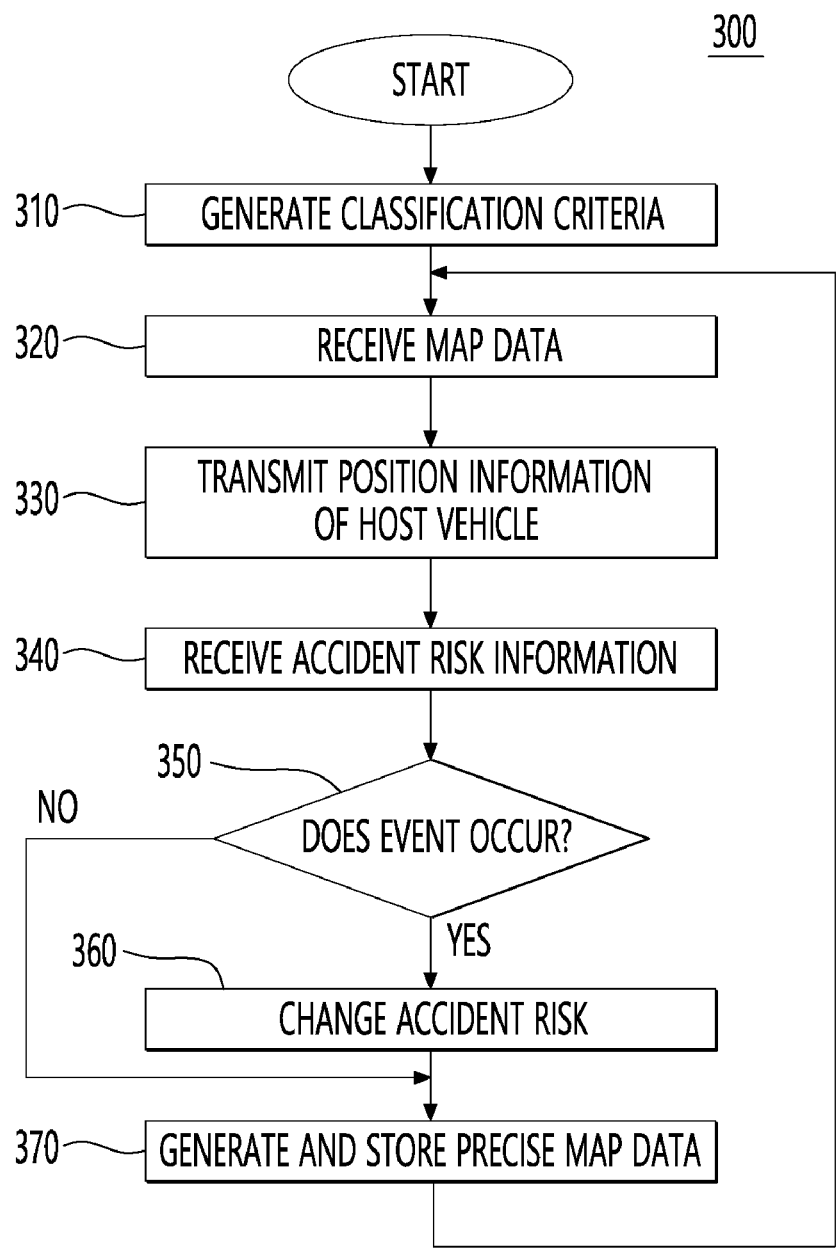

AUTONOMOUS DRIVING APPARATUS AND METHOD FOR GENERATING PRECISE MAP

CROSS-REFERENCE TO RELATED APPLICATION

This application claims under 35 U.S.C. § 119(a) the benefit of Korean Patent Application No. 10-2020-0129480, filed on Oct. 7, 2020, the entire contents of which are incorporated by reference herein.

BACKGROUND

(a) Technical Field of the Disclosure

The present disclosure relates to an autonomous driving apparatus which generates a precise map during driving of a host vehicle and a method for generating the precise map using the same, more particularly, to the autonomous driving apparatus configured to vary an application ratio of interpolation to data and whether or not to store the data acquired by applying interpolation to the data depending on an accident risk on a corresponding road and a distance from the host vehicle during driving so as to minimize power required to generate precise map data and a storage space required to store the precise map data, and a method for generating a precise map using the same.

(b) Description of the Related Art

A Voluntary Safety Self-Assessment (VSSA) published by the National Highway Traffic Safety Administration (NHTSA) recommends storage of data including driving information in an autonomous vehicle. Driving data (hereinafter, referred to simply as "data") may be stored not only when an accident occurs during autonomous driving but also when autonomous driving is normally performed. At the time of the accident, causes of the accident may be determined or circumstances of the accident may be reconstructed through the stored data. Among the stored data, precise map information around the vehicle driving before and after the accident may be regarded as environmental information, and may provide assistance in analyzing the accident and investigating the causes of the accident.

The precise map typically includes lane information (or a lane model) regarding lanes, and localization information (or a localization model) regarding facilities (curbs, guardrails, median strips, crosswalks, speed bumps, stop lines, traffic signs, traffic lights, etc.) around the lanes. The lane information is information indicating geometric points, and expresses the shapes of roads while including attribute information of the roads. The localization information is information mainly used in location determination, and accuracy in the position of a host vehicle may be increased, peripheral vehicles may be accurately mapped on the map through precise location determination and a path may be accurately generated, based on the localization information.

Because the precise map includes an enormous amount of data, as described above, a considerable volume of a storage space is necessary to store the precise map data in real time. In order to solve such a drawback, interpolation may be applied to data. However, when interpolation is applied to the precise map data, the amount of data to be stored may be reduced, but the precise map data employing interpolation may cause performance degradation in location determination and control.

SUMMARY

Accordingly, the present disclosure is directed to an autonomous driving apparatus which generates a precise map during driving of a host vehicle and a method for generating the precise map using the same.

An object of the present disclosure is to provide an autonomous driving apparatus which may vary an application ratio of interpolation to precise map data to be stored depending on an accident risk on a corresponding road and a distance from a host vehicle during driving so as to optimize the precise map data to be stored.

Another object of the present disclosure is to provide a method for generating a precise map using the above autonomous driving apparatus which may vary an application ratio of interpolation to precise map data to be stored depending on an accident risk on a corresponding road and a distance from a host vehicle during driving so as to optimize the precise map data to be stored.

Additional advantages, objects, and features of the disclosure will be set forth in part in the description which follows and in part will become apparent to those having ordinary skill in the art upon examination of the following, or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an autonomous driving apparatus includes an accident risk classification unit and an autonomous driving controller. The accident risk classification unit classifies roads into respective groups (i.e., a plurality of groups) depending on accident risks of the roads, and generates classification criteria to determine at least one of distances of the respective groups from a host vehicle, application ratios of interpolation to the respective groups, or whether or not to store data acquired by applying the interpolation to the respective groups. The autonomous driving controller transmits current position information of the host vehicle to an external apparatus using map data received from a navigation system, and generates precise map data depending on the classification criteria and accident risks of the roads collected from the external apparatus.

In another aspect of the present disclosure, a method for generating a precise map, the method including transmitting current position information of a host vehicle, receiving accident risk information, determining whether or not an event occurs, changing an accident risk, and generating and storing precise map data. In the transmitting the current position information of the host vehicle, the current position information of the host vehicle is transmitted to an external apparatus. In the receiving the accident risk information, information about the accident risk on a road on which the host vehicle is currently driving is received from the external apparatus. In the determining whether or not the event occurs, whether or not the event occurs during driving of the host vehicle on the road is determined. The changing the accident risk is performed upon determining that the event occurs, and the accident risk of the road on which the event occurs is changed. In the generating and storing the precise map data, the precise map data is generated depending on previously set classification criteria upon determining that no event occurs, or the precise map data is generated depending on the accident risk of the road when the accident risk of the road is changed, and then the generated precise map data is stored.

In a further aspect of the present disclosure, a non-transitory computer readable recording medium containing program instructions executed by a processor includes: program instructions that transmit current position information of a host vehicle to an external apparatus; program instructions that receive accident risk information of a road on which the host vehicle is currently driving from the external apparatus; program instructions that determine whether or not an event occurs during driving of the host vehicle on the road; program instructions that change an accident risk of the road on which the event occurs upon determining that the event occurs; and program instructions that generate precise map data depending on previously set classification criteria upon determining that no event occurs, or generating the precise map data depending on the accident risk of the road when the accident risk of the road is changed, and then storing the generated precise map data.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 is a table representing one example of classification criteria generated by an accident risk classification unit; and FIG. 3 is a flowchart illustrating a method for generating a precise map stored in an event data recorder (EDR) according to one embodiment of the present disclosure.

DETAILED DESCRIPTION OF THE DISCLOSURE

Figure 1:
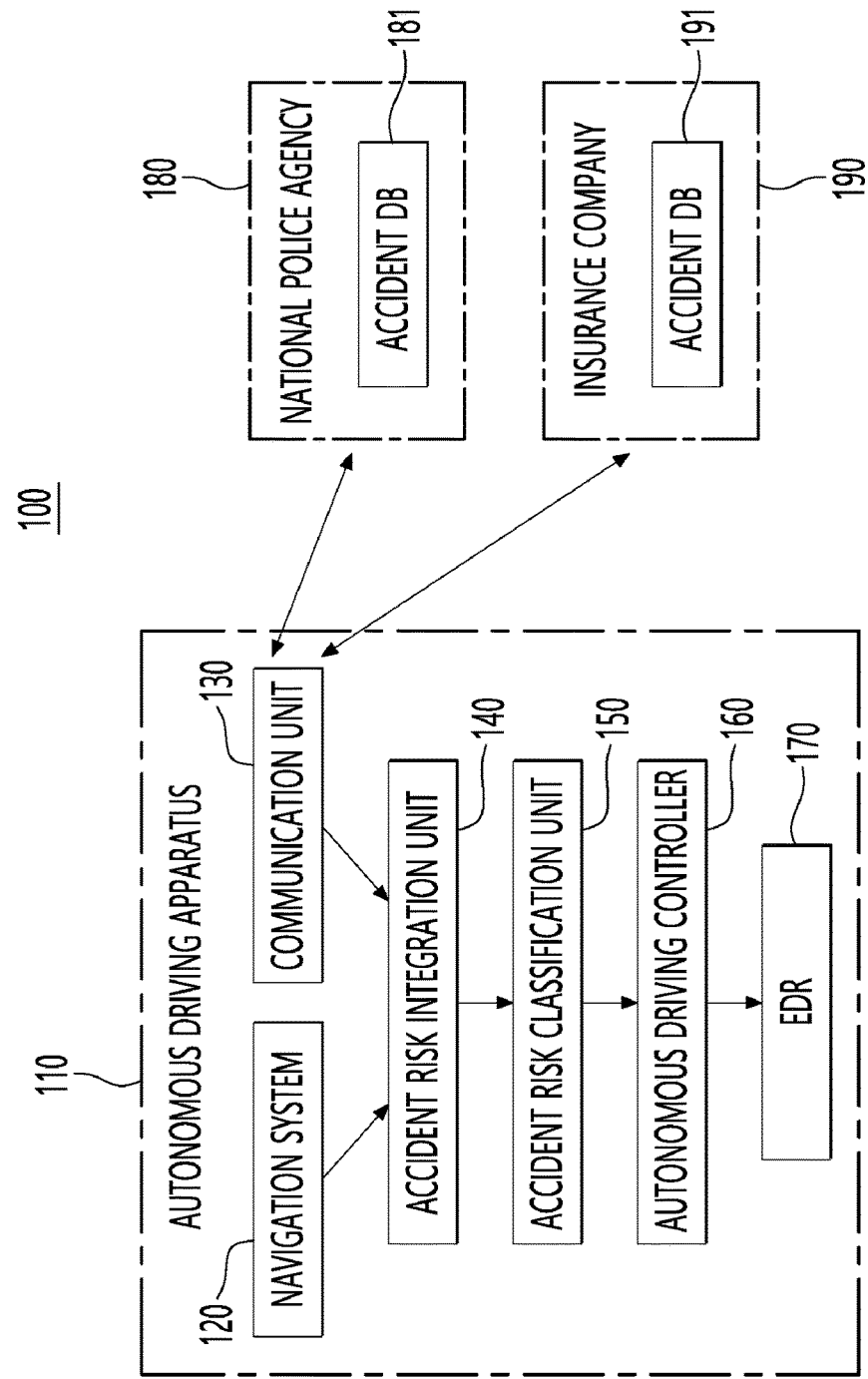
FIG. 1 is a schematic block diagram of an autonomous driving system including an autonomous driving apparatus according to one embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to preferred embodiments of the present disclosure, examples of which are illustrated in the accompanying drawings.

The disclosure of the disclosure is not limited to the embodiments set forth herein and may be variously modified. In the drawings, the same or similar elements are denoted by the same reference numerals even when they are depicted in different drawings.

According to the present disclosure, an autonomous driving apparatus mounted in an autonomous vehicle (including a general vehicle) driven on an arbitrary road, may optimize the amount of precise map data to be stored: by classifying roads into respective groups (i.e., a plurality of groups) depending on the degrees of accident risks of the roads, by setting different application ratios of interpolation to geometric points in road information (precise map data) collected from a road, on which the vehicle is currently driving, depending on the classification criteria and distances from the host vehicle, and by separately storing the data to which interpolation is applied.

FIG. 1 is a schematic block diagram of an autonomous driving system including an autonomous driving apparatus according to one embodiment of the present disclosure.

Referring to FIG. 1, an autonomous driving system 100 including an autonomous driving apparatus 110 according to the present disclosure includes the autonomous driving apparatus 110 mounted in a host vehicle, and external apparatuses 180 and 190 configured to transceive information with the autonomous driving apparatus 110. Here, the external apparatuses 180 and 190 may include an accident database (DB) 181 of a police agency (e.g., the National Police Agency 180) and an accident DB 191 of an insurance company 190.

The autonomous driving apparatus 110 includes a navigation system 120, a communication unit 30, an accident risk integration unit 140, an accident risk classification unit 150, an autonomous driving controller 160, and an event data recorder (EDR) 170.

The navigation system 120 transmits map data of a road on which the host vehicle is currently driving to the autonomous driving controller 160, and in some embodiments, may store information regarding the accident risk of the road on which the host vehicle is currently driving.

The communication unit 130 receives information regarding the accident risk of the road on which the host vehicle is currently driving from the accident DB 181 of the National Police Agency 180 and the accident DB 191 of the insurance company 190, for example, by performing wireless communication with the National Police Agency 180 and the insurance company 190.

The accident risk integration unit 140 integrates the information regarding the accident risk of the road on which the host vehicle is currently driving, collected through the navigation system 120 and the communication unit 130.

The accident risk classification unit 150 classifies roads into respective groups depending on the accident risks of the roads, and generates classification criteria including detailed classification items to the respective groups. Although it is described that the accident risk classification unit 150 generates the classification criteria for convenience of description, the autonomous driving controller 160 may generate the classification criteria or a transportation-related agency may generate the classification criteria and then provide the classification criteria to the autonomous driving controller 160 in some embodiments.

FIG. 2 is a table representing one example of classification criteria generated by the accident risk classification unit.

Referring to FIG. 2, during a classification process, in the first stage, roads are classified into three groups, i.e., a safety group, a caution group and a danger group, depending on accident risks of the roads. A road belonging to the safety group is a road determined as having a low accident risk, a road belonging to the caution group is a road determined as not having a high accident risk but requiring cautious driving, and a road belonging to the danger group is a road determined as having a considerably high accident risk and thus requiring extremely cautious driving.

In the second stage, each of the three groups classified in the first stage is classified into three sub-groups based on a distance 100 m and a distance 300 m from a road on which the host vehicle is driving, in the three stage, the application ratios of interpolation (interpolation ratios (%)) applied to a total of nine sub-groups classified in the second stage are set, and in the final stage, i.e., the fourth stage, whether or not to store precise map data belonging to the nine sub-groups in the EDR 170 is determined.

For example, among precise map data belonging to the safety group, precise map data including a localization model, acquired by applying interpolation to precise map data located within a distance of 100 m from the host vehicle by 100%, is stored in the EDR 170. Interpolation is applied to precise map data located within a distance of 300 m from the host vehicle by 50%, interpolation is not applied to precise map data located at a distance equal to or greater than 300 m from the host vehicle, and precise map data including a localization model acquired thereby are not stored in the EDR 170.

Among precise map data belonging to the caution group, precise map data including a localization model, acquired by applying interpolation to precise map data located within a distance of 100 m from the host vehicle by 100%, is stored in the EDR 170, and precise map data including a localization model, acquired by applying interpolation to precise map data located within a distance of 300 m from the host vehicle by 80%, is stored in the EDR 170. However, precise map data including a localization model, acquired by applying interpolation to precise map data located at a distance equal to or greater than 300 m from the host vehicle by 50%, is not stored in the EDR 170.

Among precise map data belonging to the danger group, interpolation is applied to precise map data located within a distance of 100 m from the host vehicle, precise map data located within a distance of 300 m from the host vehicle, and precise map data located at a distance equal to or greater than 300 m from the host vehicle by 100%, and all precise map data including a localization model acquired thereby is stored in the EDR 170.

Referring to the classification criteria in FIG. 2, in order to solve performance degradation in location determination and control caused by applying interpolation to all lane information, in the present disclosure, interpolation is selectively applied and the application ratio of the interpolation varies depending on the classification group of data.

The geographical range of precise map data which may be received from the navigation system 120 is 1-3 km in case of a main path, and is 0.3-1 km in case of a sub-path. The geographical range of precise map data used in location determination and control is 100 m centered on the host vehicle, and precise map data within a distance of 800 m in front of the host vehicle is used in a logic circuit configured to generate a driving path. Here, 100 m corresponds to the recognition distance of a LiDAR. 100 m and 300 m used in the second state of FIG. 2 are set for the above-described reasons, and other reference distances may be set for other reasons in other embodiments.

In general, when an accident is reenacted, precise map data close to the host vehicle is the most important and data importance is lowered as a distance from the host vehicle increases, and such logic is applied when whether or not to store precise map data is determined in FIG. 2. That is, precise map data around the host vehicle is stored in more detail, and precise map data far away from the host vehicle is stored in less detail. Therefore, in a place belonging to the danger group, precise map data are stored in more detail even when a distance from the host vehicle increases.

When a driving path is generated, the number of geometric points located behind the distance of 100 m from the host vehicle has less influence on location determination and control performance, and there is no logic circuit using localization model data behind the distance of 100 m from the host vehicle.

The event data recorder (EDR) 170 is equipment which records various vehicle information for about five seconds at a point in time when a vehicle collision occurs, and is a kind of black box for recording data, which is installed in an air bag or an engine electronic control unit (ECU) of a vehicle. The EDR 170 may store various accident and collision information, such as a vehicle speed, whether or not a brake is operated, the RPM of an engine, whether or not a driver or a passenger wears a seat belt, seriousness of impact, the position of an accelerator pedal, a steering angle, tire pressure, the position of a transmission gear, deployment information of air bags, etc., except for image and voice records.

In order to avoid confusion in terms, an accident data recorder (ADR) will be described. The ADR includes a black box for vehicles, and stores and records a plurality of pieces of image data (front and rear images, AVM images, etc.) and a plurality of pieces of sensor data measured by vehicle sensors including a radar sensor and a LiDAR sensor.

The autonomous driving controller 160 processes the precise map data depending on the groups classified by the accident risk classification unit 150, and stores the processed precise map data in the EDR 170.

In order to help understanding of the present disclosure, elements which configure the precise map data will be described.

As described above, the precise map data may include the lane information (or the lane model) and the localization information (or the localization model).

The lane information (or the lane model) includes information ROAD-LINK regarding a representative line indicating a lane, information LANE_SIDE regarding two lane sides indicating boundary lines of the lane, and information LANE_LINK indicating the central line of the lane, i.e., a middle line between the two lane sides.

The localization information (or the localization model) includes information ROAD_SIDE indicating curbs, guardrails, median strips, pedestrian overpasses, information ROAD_MARK indicating crosswalks, speed bumps, stop lines, arrows, information TRAFFIC_SIGN indicating traffic signs, and information TRAFFIC_LIGHT indicating traffic lights.

Most of the total capacity of the precise map data is occupied by the geometric points, and as the number of the geometric points of the lane model increases, the amount of data to be stored in the EDR 170 increases.

FIG. 3 is a flowchart illustrating a method for generating a precise map stored in the EDR according to one embodiment of the present disclosure.

Referring to FIG. 3, a method 300 for generating a precise map according to the present disclosure may be performed using the autonomous driving system 100 shown in FIG. 1, and may include generating classification criteria (step 310), receiving map data (step 320), transmitting position information of the host vehicle (step 330), receiving accident risk information (step 340), determining whether or not an event occurs (step 350), changing an accident risk (step 360), and generating and storing precise map data (step 370).

Generation of the classification criteria (step 310) is performed by the accident risk classification unit 150, and in generation of the classification criteria (step 310), the accident risk classification unit 150 classifies roads into respective groups depending on the accident risks of the roads, and generates classification criteria including detailed classification items to the respective groups.

In reception of the map data (step 320), the autonomous driving controller 160 receives map data of a road on which the host vehicle is currently driving from the navigation system 120.

Transmission of the position information of the host vehicle (step 330) is performed by the autonomous driving controller 160, and in transmission of the position information of the host vehicle (step 330), the autonomous driving controller 160 transmits the current position of the host vehicle to the external apparatuses 180 and 190 through the communication unit 130 using the map data received from the navigation system 120.

In reception of the accident risk information (step 340), information regarding the accident risk of the road on which the host vehicle is currently driving is received from the accident DB 181 of the National Police Agency 180 and the accident DB 191 of the insurance company 190 through the communication unit 130, and is transmitted to one of the accident risk integration unit 140 and the autonomous driving controller 160.

Determination as to whether or not the event occurs (step 350) is performed by the autonomous driving controller 160, and in determination as to whether or not the event occurs (step 350), the autonomous driving controller 160 determines whether or not the event occurs. Here, the event includes at least one of an accident between vehicles, an accident between a vehicle and a road facility, an accident between a vehicle and an animal, or a landslide.

A change in the accident risk (step 360) is performed by the autonomous driving controller 160 upon determining that the event occurs (Yes in step 350), and in changing the accident risk (step 360), the autonomous driving controller 160 changes the accident risk of the road on which the event occurs. Here, an accident risk higher than the accident risk previously allocated to the road is reallocated to the road, and in this case, although the accident risk is changed into an accident risk improved by one level, the accident risk may be changed into the highest accident risk.

In generation and storage of the precise map data (step 370), upon determining that no event occurs in determination as to whether or not the event occurs (No in step 350), the precise map data is generated depending on the previously allocated classification items and is stored in the EDR 170, and when the accident risk is changed (step 360), the precise map data is generated depending on the changed accident risk and is stored in the EDR 170.

When the host vehicle is driven on the road, the remaining operations, i.e., receiving map data (step 320), transmitting position information of the host vehicle (step 330), receiving accident risk information (step 340), determining whether or not an event occurs (step 350), changing an accident risk (step 360) and generating and storing precise map data (step 370), other than generating classification criteria (step 310) are continuously performed.

Referring to FIGS. 1 to 3 and the above description, the amount of the precise map data will be expected as below.

Assuming that the precise map data is stored every 100 milliseconds, about 500 MB of radar, LiDAR and camera information per minute is stored, and this amount of the information does not include raw data received by a LiDAR and a camera. When raw data is added, the amount of information to be stored may exceed about 1 GB per minute.

The amount of precise map data located within a distance of 1 km in front of the host vehicle and a distance of 300 m around the host vehicle is about 5 MB, and when the precise map data is continuously stored every 100 milliseconds, the amount of the precise map data may be 3 GB per minute.

In case of a road belonging to the safety group, the precise map data of a main path may be reduced by about 80%, and the precise map data within a distance 300 m around the host vehicle may be reduced by about 45%. The reduction ratio of the precise map data of the road around the host vehicle may be varied depending on the shape of the road.

As is apparent from the above description, in an autonomous driving apparatus and a method for generating a precise map using the same, an application ratio of interpolation to data and whether or not to store data acquired by applying interpolation to the data are varied depending on an accident risk on a corresponding road and a distance from a host vehicle, so as to allow precise map data around the host vehicle important in accident reenactment to be stored in more detail and to allow precise map data regarded as less important to be stored with a reduced amount thereof or not to be stored as long as an event does not occur, thereby being capable of reducing the load of a CPU required to store the data and thus reducing power consumption.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An autonomous driving apparatus for a host vehicle, comprising:
   an accident risk classification unit comprising a memory storing first program instructions and a first processor configured to:
      classify roads around the host vehicle into respective groups depending on accident risks of the roads; and
      generate for each of the roads, classification criteria determining application ratios of interpolation for generating precise map data or whether or not to store the precise map data, according to a distance from the host vehicle by executing the program instructions; and
   an autonomous driving controller configured to:
      transmit current position information of the host vehicle to an external apparatus using map data received from a navigation system;
      generate and store the precise map data depending on the classification criteria; and
      control the host vehicle based on the precise map data.

2. The autonomous driving apparatus according to claim 1, further comprising the navigation system configured to provide the map data.

3. The autonomous driving apparatus according to claim 2, further comprising an accident risk integration unit comprising a memory storing second program instructions and a second processor configured to integrate information about the accident risks of the roads received from at least one of the navigation system or the external apparatus by executing the second program instructions.

4. The autonomous driving apparatus according to claim 1, further comprising an event data recorder (EDR) configured to store the precise map data generated by the autonomous driving controller.

5. The autonomous driving apparatus according to claim 1, wherein the external apparatus comprises at least one of an accident database (DB) of a police agency or the accident DB of an insurance company.

6. An autonomous driving system comprising:
   an autonomous driving apparatus; and
   an external apparatus comprising at least one of an accident database (DB) of a police agency or the accident DB of an insurance company, configured to receive current position information of a host vehicle provided with the autonomous driving apparatus mounted therein and to transmit an accident risk of a road corresponding to the current position information of the host vehicle to the autonomous driving apparatus;
   wherein the autonomous driving apparatus comprises;
      an accident risk classification unit configured to classify roads around the host vehicle into respective groups depending on accident risks of the roads and to generate, for each of the roads, classification criteria of determining application ratios of interpolation for generating precise map data or whether or not to store the precise map data according to a distance from the host vehicle; and
      an autonomous driving controller configured to transmit current position information of the host vehicle to an external apparatus using map data received from a navigation system and to generate and store the precise map data depending on the classification criteria;
      wherein the autonomous driving controller is further configured to control the host vehicle based on precise map data generated based on the accident risk.

7. A method for controlling a vehicle with an autonomous driving controller installed therein, the method comprising:
   transmitting, by the autonomous driving controller, current position information of a host vehicle to an external apparatus;
   receiving, by the autonomous driving controller, accident risk information of a road on which the host vehicle is currently driving from the external apparatus;
   determining, by the autonomous driving controller, whether or not an event occurs during driving of the host vehicle on the road;
   changing, by the autonomous driving controller, an accident risk of the road on which the event occurs upon determining that the event occurs;
   classifying roads around the host vehicle into respective groups depending on accident risks of the roads and setting for each of the roads classification criteria of determining application ratios of interpolation for generating precise map data or whether or not to store the precise map data according to a distance from the host vehicle;
   generating, by the autonomous driving controller, the precise map data depending on the previously set classification criteria upon determining that no event occurs, or generating the precise map data depending on the accident risk of the road when the accident risk of the road is changed, and then storing the generated precise map data, and
   controlling, by the autonomous driving controller, the vehicle based on the precise map data.

8. The method according to claim 7, further comprising receiving map data from a navigation system, wherein transmitting the current position information of the host vehicle to the external apparatus comprises generating the position information of the host vehicle using the map data.

9. The method according to claim 7, wherein the event comprises at least one of an accident between vehicles, an accident between a vehicle and a road facility, an accident between a vehicle and an animal, or a landslide.

10. The method according to claim 7, wherein changing the accident risk of the road comprises increasing the accident risk of the road on which the event occurs, previously allocated to the road.

11. The method according to claim 10, wherein changing the accident risk of the road comprises allocating an uppermost accident risk to the road on which the event occurs.

12. The method according to claim 8, wherein, when the host vehicle is driven on the road, transmitting the position information of the host vehicle, receiving the accident risk information of the road, the determining whether or not the event occurs, changing the accident risk of the road, and generating and storing the precise map data are continuously performed.

13. The method according to claim 7, wherein generating and storing the precise map data comprises storing the precise map data in an event data recorder (EDR).

14. A non-transitory computer readable recording medium containing program instructions implementing the method of claim 7 by being executed by a processor.

* * * * *